United States Patent [19]
Mullen

[11] 3,776,373
[45] Dec. 4, 1973

[54] SYSTEM FOR REPLACING FAUCET HANDLES

[75] Inventor: John L. Mullen, Lindenhurst, N.Y.

[73] Assignee: Crest Good Manufacturing Company, Inc., Syosset, N.Y.

[22] Filed: July 10, 1972

[21] Appl. No.: 270,459

[52] U.S. Cl. ......... 206/16 R, 33/178 B, 33/179.5 R
[51] Int. Cl. ........................ B65d 85/62, G01b 3/34
[58] Field of Search ................ 206/16 R; 33/174 R, 33/178 B, 179.5 R

[56] References Cited
UNITED STATES PATENTS

| 1,881,651 | 10/1932 | Judge | 33/174 X |
| 3,127,986 | 4/1964 | Hulka | 206/16 R |
| 2,728,145 | 12/1955 | Holladay | 33/178 B X |

FOREIGN PATENTS OR APPLICATIONS

| 575,648 | 2/1946 | Great Britain | 33/178 B |

Primary Examiner—Leonard Summer
Attorney—Harold D. Steinberg et al.

[57] ABSTRACT

A system for replacing worn faucet handles. The system includes standardized faucet handles capable of replacing different types of faucet handles of many different plumbing fixture manufacturers. The standardized handles have interior recesses of the same non-circular cross section for receiving adaptors of the same external cross section matching that of the handle recesses. The adaptors however are provided with internally toothed recesses which have different characteristics for matching the different splined ends of valve stems of different manufacturers. A gauge is used for selecting a proper adaptor, this gauge being in the form of a plate formed with a series of toothed openings all of which have different characteristics. These openings can be tried one after the other on the splined end of a given valve stem until an opening is found which has a snug precise fit with respect to the particular splined end which is tested. The plate which forms the gauge carries adjacent the several openings indicia for identifying the different adaptors, so that once a proper opening is found on the gauge, the indicia adjacent the latter opening will indicate which adaptor should be used for the standardized handle.

6 Claims, 12 Drawing Figures

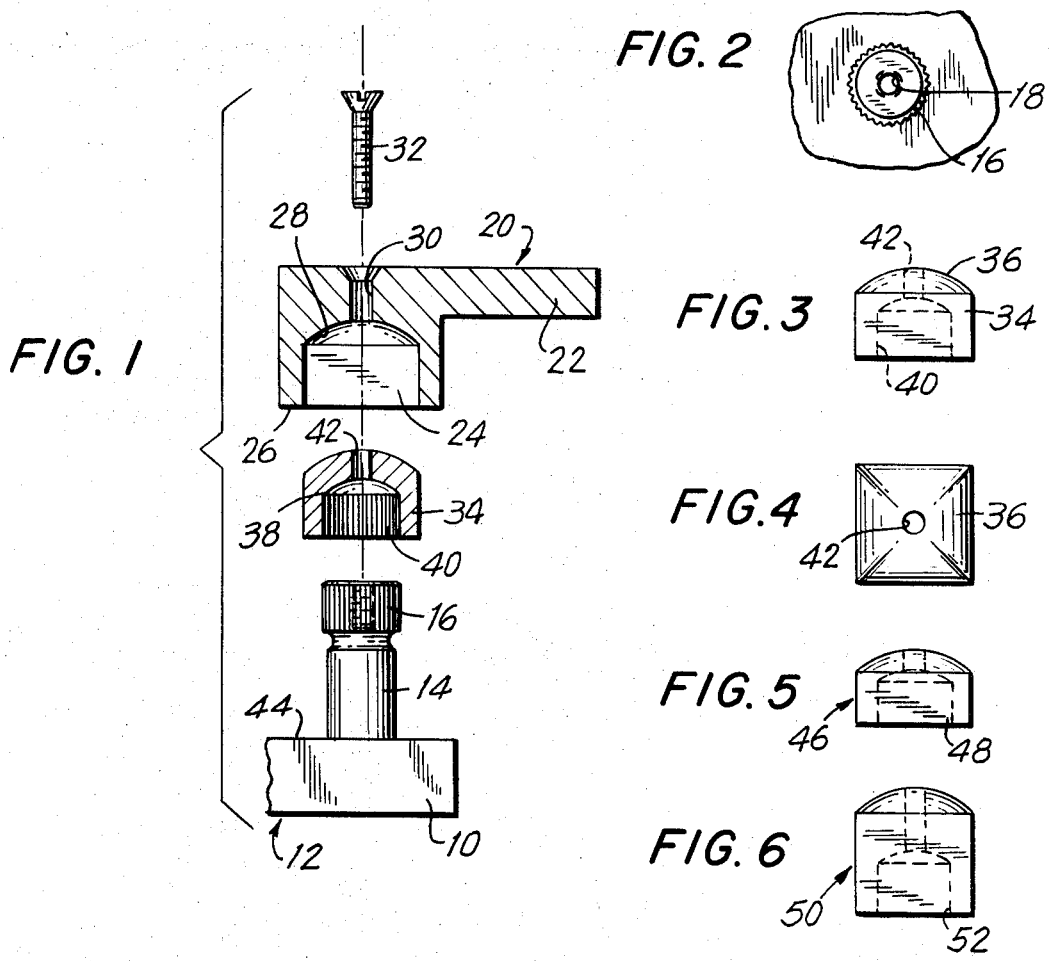
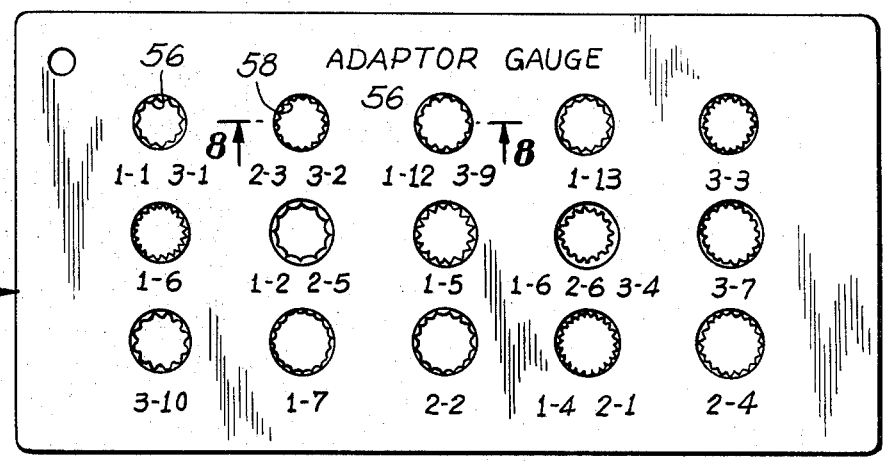

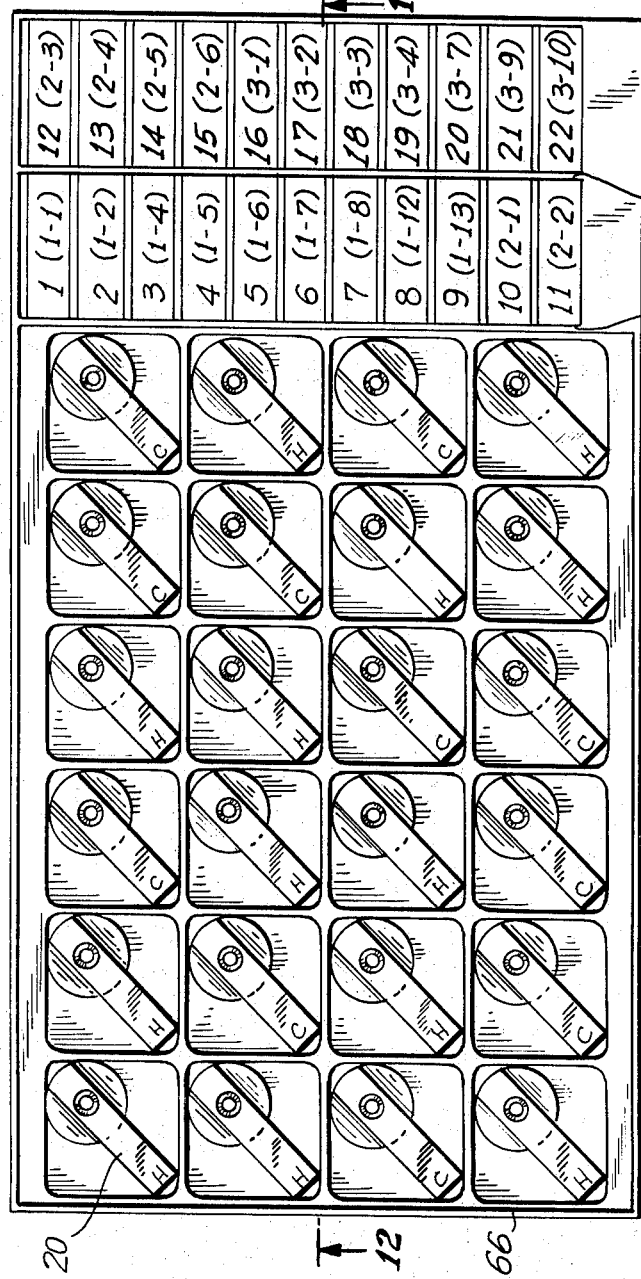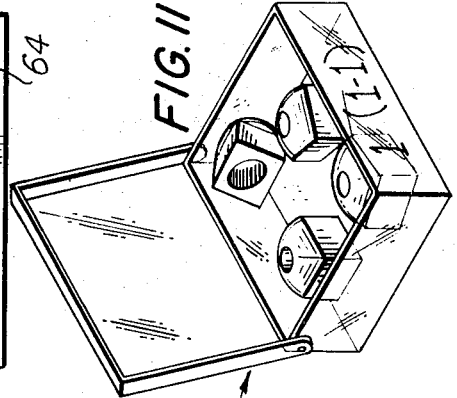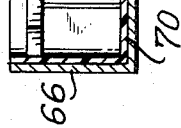

SYSTEM FOR REPLACING FAUCET HANDLES

BACKGROUND OF THE INVENTION

The present invention relates to a system for replacing worn faucet handles.

As is well known, there are many different manufacturers of plumbing fixtures. These manufacturers provide widely varying constructions for sink faucets. It is particularly in connection with the handles of such faucets that one encounters the most widely different types of constructions. Such faucet handles of different manufacturers have many different shapes and sizes.

It is precisely this latter condition which creates particular problems for a plumber. Thus, a plumber will often be able to repair a sink faucet as by repairing the valve structure thereof. However, when it is necessary to replace a worn faucet handle, it very frequently happens that the plumber does not have on hand the particular handle required to replace the particular worn faucet handle. Thus, in order to be able to replace most faucet handles, it is essential for a plumber to carry about a large variety of handles of different manufacturers. However, even under these latter conditions it is not unusual for a plumber to encounter a handle for which he has no replacement. The result is a considerable loss of time and great inconvenience in obtaining a proper faucet handle, and in some cases the particular models which are required are discontinued so that it is virtually impossible to obtain a proper faucet handle. Under such conditions it may be necessary to replace an entire fixture, even though it is only the faucet handle which is worn and requires replacement.

SUMMARY OF THE INVENTION

It is accordingly a primary object of the present invention to provide a system for avoiding the above drawbacks.

In particular, it is an object of the invention to provide a system which will enable a plumber to replace virtually any faucet handle with a standardized faucet handle.

Thus, it is an object of the invention to provide a system which will permit a plumber to carry about a number of handles all of which have the same structural details while at the same time making it possible for the plumber to replace the handle of any manufacturer with the standarized faucet handle.

In particular, it is an object of the invention to provide the plumber with the possibility of using relatively small adaptors of different characteristics for adapting a standardized faucet handle to any valve stem.

It is furthermore one of the primary objects of the present invention to provide the plumber with a gauge which makes it possible for the plumber to quickly identify which adaptor is required to adapt a given valve stem to the standardized faucet handle.

Therefore, it is an object of the invention to provide a system according to which a plumber need only carry about a number of different types of relatively small adaptors to enable different types of valve stems to be used with standardized handles so that only a relatively small number of handles need be carried about by the plumber.

According to the invention, the system includes a gauge in the form of a plate formed with a plurality of toothed openings of different characteristics. These openings of the gauge plate may be tried one after the other on the splined end of a given valve stem until the latter splined end fits snugly through one of the openings. The gauge plate carries adjacent the several toothed openings thereof indicia for respectively identifying adaptors. Thus, when an opening of the gauge plate which fits a given splined end of a valve stem is found, this opening will have adjacent thereto indicia indicating to the plumber which adaptor is to be used for the particular valve stem. The plumber then selects this latter adaptor and is thus capable of using a standardized handle with the particular valve stem.

BRIEF DESCRIPTION OF DRAWINGS

The invention is illustrated by way of example in the accompanying drawings which form part of this application and in which:

FIG. 1 is a partly schematic and partly sectional exploded elevation of components which are capable of being assembled to connect to a given valve stem a standarized handle in accordance with the invention;

FIG. 2 is a top plan view of the valve stem of FIG. 1;

FIG. 3 shows an adaptor of the invention in elevation;

FIG. 4 is a top plan view of the adaptor of FIG. 3;

FIGS. 5 and 6 respectively illustrate adaptors which are identical with that of FIG. 3 except that the adaptors of FIGS. 5 and 6 have different heights;

FIG. 7 illustrates an adaptor gauge of the present invention;

FIG. 8 is a fragmentary sectional elevation taken along line 8—8 of FIG. 7 in the direction of the arrows for illustrating further details of the gauge of the invention;

FIG. 9 is a top plan view of a box which may conveniently be carried about by the plumber and which is adapted to contain adaptors of different types as well as standardized faucet handles;

FIG. 10 is an illustration of a card carrying printed matter for identifying the containers in which various adaptors are located;

FIG. 11 is a perspective illustration of one of the containers with a plurality of adaptors therein; and FIG. 12 is a sectional elevation of the box and contents of FIG. 9 taken along line 12—12 of FIG. 9 in the direction of the arrows.

DESCRIPTION OF PREFERRED EMBODIMENTS

Referring to FIG. 1, there is shown at the lower part thereof, in a fragmentary schematic manner, an outer housing part 10 of a faucet fixture 12 of any known construction. The faucet includes a valve stem 14 which projects upwardly from the housing 10 and which terminates in an upper externally splined end 16. The stem 14 is turned in a well known manner for opening and closing the faucet. In order to turn the stem 14, it is customary to fix to the stem a faucet handle. This faucet handle of the particular manufacturer of the fixture 12 will have its own particular characteristics and will be provided with an internal recess formed with teeth which match those of the splined end 16. This splined end 16 is conventionally received in the toothed recess formed in the handle, and a screw is passed through a bore of the handle to be received in a threaded bore formed along the axis of the stem 14 as is also conventional. Thus, FIG. 2 shows in the top plan view of the stem 14 the threaded bore 18 which is adapted to receive the screw for conventionally fixing the handle to the stem 14.

As has been indicated above, because of the large number of manufacturers of faucet fixtures and because of the fact that these fixtures of different manufacturers are provided with different types of handles with even a single manufacturer providing different handles for different types of faucets, there is only a small possibility that the plumber will have on hand the particular faucet handle which is required to replace the worn faucet handle.

In order to alleviate this problem, there is provided in accordance with one of the features of the invention a standardized handle 20 having a construction as illustrated in FIG. 1. As will be apparent from the description which follows, the plumber need only carry about a relatively small number of these handles 20. All of the standardized handles 20 will have identical structural characteristics. The only difference between the handles will be, for example, that some will be suitably marked to indicate hot water while others will be suitably marked to indicate cold water, and the turning levers 22 of the several standardized handles 20 may be provided in two lengths, the shorter length being used for relatively small sinks while the longer length may be used for relatively large sinks. However, at the region of its left end, as viewed in FIG. 1, all of the handles 20 have an identical construction.

Thus, referring to FIG.1 it will be seen that the handle 20 is provided at its left end portion, as viewed in FIG. 1, with an internal recess 24 extending upwardly from the bottom end 26 of the handle 20. This recess 24 is of a non-circular cross section such as a square cross section, for example. At its upper portion the recess 24 has concave dome portion 28, which may form part of a sphere, for example. The faucet handle 20 is also formed with a bore 30 to receive the fastening screw 32 which extends through the bore 30 into the threaded bore 18 of the stem 14.

In order to connect the standardized handle 20 properly to the stem 14, an adaptor 34 is situated between the stem 14 and the handle 20. This adaptor 34 may be made of brass, for example, while the handle 20 may be coated with chrome. The outer cross section of the adaptor 34 mathes the cross section of the recess 24. Also, the upper end region of the adaptor 34 matches the configuration of the upper region 28 of the recess 24.

Thus, referring to FIG. 3, the adaptor 34 is shown as it appears at the exterior. Thus, the adaptor 34 has an exterior square cross section, as is particularly apparent from FIG. 4, while having the upper convex end 36 to be received in the part 28 of the recess 24.

In its interior the adaptor 34 is formed with a recess 38 and is provided at the recess 38 with teeth 40 which match the teeth at the splined end 16 of the stem 14. The adaptor 34 is also formed with an opening 42 which becomes aligned with the threaded bore 18 as well as the bore 30, so that the screw 32 passes first through the bore 30, then through the opening 42 and then into the threaded bore 18 for maintaining the components assembled. Thus, with the components assembled in this manner, due to the non-circular cross section between the mating adaptor and recess 24 of the handle 20, when the latter is turned the adaptor 34 will turn, and the turning movement of the latter is transmitted from the teeth 40 to the teeth of the splined end 16 of the stem 14, so that this stem 14 will now turn.

The height of the adaptor 34 is such that when it is situated within the recess 24, the bottom end face 26 of the handle will be situated just above the deck 44 of the housing 10 having with respect thereto a clearance which may be on the order of 1/16 inch, for example.

Different manufacturers provide valve stems 14 of different lengths as well as valve stems having different types of splined end portions 16. Thus, the valve stems and their splined ends may have different diameters and different numbers of teeth at the splined ends.

Considering first the different lengths of valve stems which may be encountered, it may happen that when the adaptor 34 is in the recess 24 the desired relatively small clearance between the face 26 and the deck 44 is not achieved. In other words even though the teeth 40 of a given adaptor 34 may match the teeth 16, the height of the adaptor may be such that the handle will not be located at the proper elevation on the stem. Therefore, there is provided in accordance with the invention adaptors of different heights. Thus, FIG. 5, shows an adaptor 46 which may be identical with the adaptor 34 except that the square portion 48 has a lesser height than the corresponding portion of the adaptor 34. FIG. 6 shows an adaptor 50 identical with the adaptor 34 except that the square portion 52 of the adaptor 50 has a greater height than the corresponding portion of the adaptor 34.

Thus, if it should happen that when the adaptor 34 is placed in the recess 24 the face 26 engages the deck 44, then the plumber knows that an adaptor of greater height is required, and the operator will replace the adaptor 34 with the adaptor 50. The depth of the recess 24 is equal to the depth of the adaptor 50 of greatest height, so that irrespective of the particular adaptor which is used it will always be located completely within the recess 24. Thus, when using the adaptors 34 and 46 part of the recess 24 will extend downwardly beyond the adaptor. By using the adaptor of FIG. 6 it is possible to raise the elevation of the handle and achieve the desired clearance between the end face 26 of the handle and the deck 44. If it should happen that when the adaptor 34 is used there is too much clearance between the face 26 and the deck 44, then the adaptor 34 is replaced by the adaptor 46, which because of its relatively short length will enable the face 26 to be located closer to the deck 44.

It is apparent, therefore, that with the system of the invention the plumber need only carry about different adaptors of different characteristics, and because these adaptors are relatively small there is no great problem in carrying about a relatively large number of different adaptors of different characteristics. However by using these relatively small adaptors of different characteristics it is possible to replace any worn handle with the standardized handle 20 of the invention, so that only a relatively small number of standardized handles need be used.

As is apparent from the above description, it is necessary for the plumber to be able to identify which adaptor will match the splined end 16 of a given stem 14. In order to enable this matching process to be carried out with the greatest convenience, there is provided in accordance with a primary feature of the present invention a gauge plate 54 shown in FIGS. 7 and 8. This plate 54 may be made of any suitable metal or plastic and has a substantial thickness on the order of ¼ inch, for example. The gauge 54 is formed with a plurality of toothed openings 56, the several openings extending completely through the plate 54 which has a uniform thickness and these openings having the teeth 58 which are adapted to mesh with the teeth of the splined end 16 of a stem 14.

As is apparent from FIG. 7, the several openings 56 are of different diameters and they have different numbers of teeth of different characteristics. These toothed openings 56 are precisely formed in such a way that a valve stem 14 of virtually any manufacturer is capable of having its splined end 16 received with a snug, precise fit in one of the openings 56.

The plate 54 carries at the several openings 56 indicia for identifying the adaptors. Thus, it will be noted that just below the upper left opening 56 of FIG. 7, the plate 54 carries the indicia "1—1" and "1–1". The next lower opening carries the indicia "1–8". Thus it will be noted that some of the openings have only one set of indicia while other openings have a plurality of sets of indicia. These indicia are used to identify the adaptors.

With a valve stem 14 exposed as shown at the lower part of FIG. 1, the plumber will try successive openings 56 of the gauge 54 on the splined end 16, until the plumber finds an opening 56 through which the splined end 16 extends with a precise snug fit. Then the plumber will known from the indicia adjacent this particular opening which adaptor is to be used.

It is known from experience that with a splined end which fits either of the two lower left openings in the left row of FIG. 7, only one particular type of adaptor will be required to locate the standardized handle 20 at the proper elevation with respect to the deck 44. On the other hand, with an opening 56 such as that shown at the upper left corner of the plate 54 in FIG. 7, it is known that the same splined end is used by different manufacturers with stems of different heights, so that for this reason a plurality of indicia 60 are provided at the upper left opening 56 of FIG. 7.

The first numeral of each set of indicia indicates the height of the adaptor. Thus the series 1 adaptors are the shortest adaptors shown in FIG. 5, the series 2 adaptors are the intermediate adaptors shown in FIG. 3, and the series 3 adaptors are the tallest adaptors shown in FIG. 6. Each set of indicia is provided with a second numeral which identifies a particular adaptor of the height indicated by the first numeral of the set of indicia.

Thus, a number of 1—1 adaptors will be located in one box such as the box shown in FIG. 11. This box may be a simple transparent plastic container having a hinged lid which may be snapped shut and opened in a well known manner. This box shown in FIG. 11 will contain the 1—1 adaptors and may be designated by the number 1. Thus, the different adaptors may be respectively located in different containers 62 with each container 62 containing a plurality of identical adaptors. Thus, the container 62 shown in FIG. 11 contains a plurality of identical 1—1 adaptors.

Thus, with this system of the invention the plumber need only carry about a relatively small number of standardized handles 20. With this small number of standardized handles 20 the operator will also carry a plurality of the containers 62 which respectively contain the different types of adaptors. The plumber may also carry a code card shown in FIG. 10. This card 64 has printed thereon a code according to which it is possible to identify from the adaptor numbers on the gauge 54 the particular box in which the required adaptors are located. It will be seen from FIG. 10 that box number 1 is indicated as containing adaptors 1—1, box number 2 as containing adaptors 1–2, and so on. Therefore by consulting the card 64 the operator will be able to find which box contains the required aadaptors to be used with the standardized handles 20.

As a matter of convenience, the several standardized handles and boxes 62 may be carried about in a suitable larger box 66 shown in FIGS. 9 and 12. The rectangular box 66 may be covered by any suitable lid which may be hinged thereto or which may be simply in the form of a cover capable of being slipped onto and removed from the box 66. The illustrated box is provided with a pair of partitions 68 defining parallel elongated chambers in which the several boxes 62 may be situated as indicated in FIG. 9. The boxes 62 when placed in these spaces have upwardly directd ends carrying the box numbers. Next to these box numbers the boxes may also be provided with the adaptor-identifying indicia, as indicated in FIG. 9, so that the use of a card 64 is not essential.

To the left of the left partition 68 shown in FIG. 9, the box 66 is adapted to accommodate a tray 70 which is formed with a plurality of compartments in which the several standardized handles 20 are located. Therefore, with this relatively small box 66 and the parts carried thereby, and of course including the adaptor gauge 54, it is possible for a plumber to replace virtually any worn faucet handle with the standardized handle of the invention.

The only other equipment which may be used, if desired, is a suitable tap for rethreading the opening 18, if required, in order to obviate any difficulty encountered in inserting the screw 32 into the opening 18.

It therefore becomes possible with the system of the invention for any plumber to replace virtually any worn faucet handle with the standardized handle of the invention, while eliminating the requirement of carrying about a large number of faucet handles of different constructions and also eliminating the inconvenience of ordering particular faucet handles when they are not on hand.

When using the gauge 54, if the particular opening 56 which fits the splined end of the valve stem has a plurality of indicia associated therewith, then by experimentation the operator will try an adaptor of one height to see if the handle is located properly with respect to the deck 44, and if this is not the case then the operator will go to another adaptor of a different height. For example, again referring to the upper left opening 56 of FIG. 7, if it should happen that the surface 26 engages the deck 44 when using an adaptor 1—1, then the operator will instead use the adaptor 3–1 which will locate the handle at a higher elevation. The operator knows either from the box markings shown in FIG. 9 or the card of FIG. 10 that the adaptors 1—1 are located in box 1 while the adaptors 3–1 are located in box 16. In this way it is possible to select any desired adaptors to locate a handle at a proper elevation.

What is claimed is:

1. For use in a system for replacing faucet handles, a gauge plate formed with a plurality of toothed openings of different characteristics for respectively receiving the splined ends of valve stems of different characteristics, so that the openings of said plate can be placed on the splined end of a given valve stem until an opening matching the splined end of a particular valve stem is found, a group of adaptor members at least some of which are identical and a group of handle members at least some of which are identical, with one of said groups including members of different heights, said plate carrying adjacent each opening indicia for identifying adaptor members which will fit the splined end of a valve stem received in a given opening of said plate, whereby when using a plurality of adaptors adapted to fit on different valve stems while capable of being received in said handle members, one of said handle members can be used to replace any worn handle, at least some of said toothed openings being provided with a plurality of indicia respectively identifying members of said one group which are of different heights so that for a given valve stem it is possible to locate the replacement handle member at a proper elevation, said handle members respectively being formed with recesses for receiving said adaptor members with said recesses being deep enough to receive an adaptor with the latter located entirely within said recess, while use of a member of said one group of a greater or lesser height will control the elevation of the replacement handle member.

2. For use in a system for replacing faucet handles, a gauge plate formed with a plurality of toothed openings of different characteristics for respectively receiving the splined ends of valve stems of different characteristics, so that the openings of said plate can be placed on the splined end of a given valve stem until an opening matching the splined end of a particular valve stem is found, said plate carrying adjacent each opening indicia for identifying an adaptor which will fit the splined end of a valve stem received in a given opening of said plate, whereby when using a plurality of adaptors adapted to fit on different valve stems while capable of being received in a standardized handle, the latter handle can be used to replace any worn handle, said system including a plurality of adaptors of different heights, and at least some of said toothed openings being provided with a plurality of indicia respectively identifying adaptors of different heights so that for a given valve stem it is possible to locate the standardized replacement handle at a proper elevation, the system including a plurality of identical faucet handles each formed with a recess for receiving an adaptor, said recess being deep enough to receive an adaptor of maximum height so that if with the latter adaptor in a given handle the latter is situated at too high an elevation, an adaptor of lesser height can be used to lower the elevation of the handle.

3. The combination of claim 2 and wherein said recesses in the standardized handles are of a non-circular cross section, and said adaptors all having a cross sectional configuration matching that of the handle recesses.

4. The combination of claim 3 and wherein the system includes a plurality of containers for respectively containing different adaptors with a plurality of identical adaptors being situated in each container, and said containers carrying indicia capable of being identified according to the indicia carried by said gauge plate.

5. The combination of claim 4 and wherein each adaptor is formed with an internal recess which is provided with interior teeth for matching the splined end of a valve stem.

6. The combination of claim 5 and wherein each adaptor is formed with an opening to be aligned with a threaded opening of a valve stem, and each handle being formed with a bore to be aligned with the adaptor opening and the threaded opening of the valve stem, and a screw for passing through the bore of the handle, the opening of the adaptor, and into the threaded opening of the valve stem for maintaining the latter assembled with the adaptor and handle.

* * * * *